US012738397B1

(12) United States Patent
Giagnocavo

(10) Patent No.: US 12,738,397 B1
(45) Date of Patent: Sep. 15, 2026

(54) REMEDIATION OF LEAD SHEATHED INSTALLED TELECOMMUNICATIONS CABLES

(71) Applicant: CenturyLink Intellectual Property LLC, Denver, CO (US)

(72) Inventor: Patrick Giagnocavo, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 213 days.

(21) Appl. No.: 18/659,857

(22) Filed: May 9, 2024

Related U.S. Application Data

(60) Provisional application No. 63/604,463, filed on Nov. 30, 2023.

(51) Int. Cl.
*H01B 15/00* (2006.01)
*H01B 7/20* (2006.01)

(52) U.S. Cl.
CPC ........... *H01B 15/005* (2013.01); *H01B 7/204* (2013.01)

(58) Field of Classification Search
None
See application file for complete search history.

(56) References Cited

U.S. PATENT DOCUMENTS 6,470,605 B1 * 10/2002 Gilman ..................... E21B 7/18 37/323
6,615,849 B1 * 9/2003 Gilman ................. E02F 3/8816 134/167 R
10,417,755 B1 * 9/2019 Wingo .................. H04W 24/02
12,532,422 B1 * 1/2026 Kang ................... H05K 5/0217
2002/0117433 A1 * 8/2002 Naftz ........................ C02F 1/62 210/170.07
2004/0193016 A1 * 9/2004 Root .................... A61B 1/0052 600/146
2018/0095138 A1 * 4/2018 Newport .................. B25H 3/00
2021/0372276 A1 * 12/2021 Steele .................. G01V 11/002
2022/0295325 A1 * 9/2022 Lewis ................... H04L 43/065

* cited by examiner

*Primary Examiner* — Krystal Robinson

(57) ABSTRACT

Novel tools and techniques are provided for implementing remediation of lead sheathed installed telecommunications cables. In various embodiments, a remediation tool, which is configured to move within an inner portion of lead sheathing for installed telecommunications cables, includes a micro-controller device, a connector configured to connect with a compressed air hose configured to direct compressed air from an external compressed air source to an interior portion of the remediation tool, a transducer configured to convert motion from compressed air that is input via the connector into electrical power. The remediation tool further includes a material removal tool configured to remove material from at least one of the inner portion of the lead sheathing or the lead sheathing itself, one or more sensors, and a propulsion system configured to propel the remediation tool in a forwards and/or backwards direction within the inner portion of the lead sheathing for installed telecommunications cables.

20 Claims, 7 Drawing Sheets

REMEDIATION OF LEAD SHEATHED INSTALLED TELECOMMUNICATIONS CABLES

CROSS-REFERENCE TO RELATED APPLICATIONS

This application claims the benefit of U.S. Provisional Application No. 63/604,463 filed Nov. 30, 2023, entitled "Remediation of Lead Sheathed Installed Telecommunications Cables," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telecommunications remediation, and, more particularly, to methods, systems, and apparatuses for implementing remediation of lead sheathed installed telecommunications cables.

BACKGROUND

In the past, lead sheathed telecommunications cables were installed in the ground. As technology advanced, these cables became obsolete, but still remain in place underground. Removal of the lead material used in the sheathing of such cables, however, may raise issues with environmental contamination. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Overview

Figure 1:
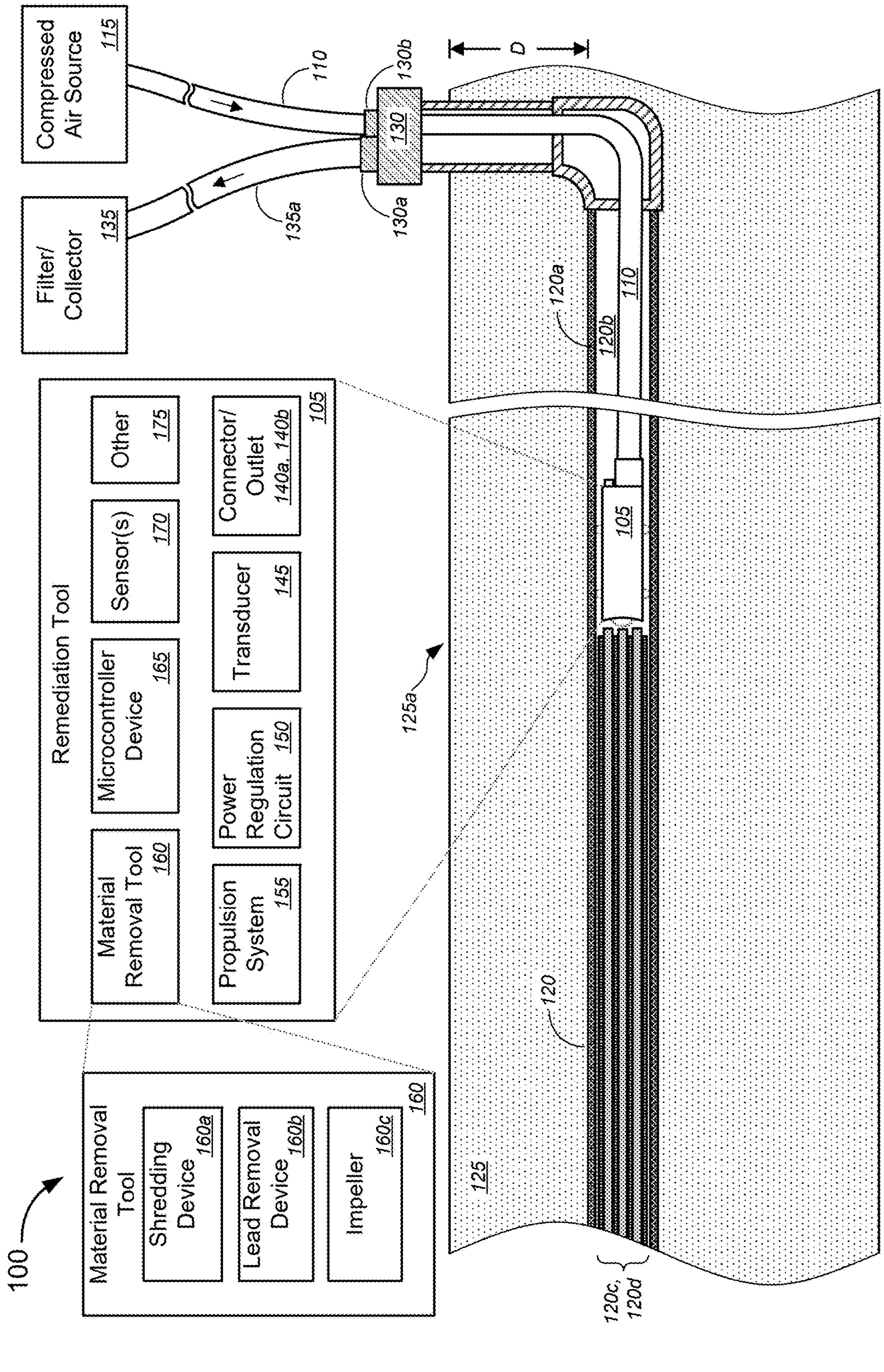
FIG. 1 depicts an example system for implementing remediation of lead sheathed installed telecommunications cables, in accordance with various embodiments.

Various embodiments provide tools and techniques for implementing telecommunications remediation, and, more particularly, to methods, systems, and apparatuses for implementing remediation of lead sheathed installed telecommunications cables.

In various embodiments, a remediation tool is configured to move within an inner portion of lead sheathing for installed telecommunications cables and to remove material from at least one of the installed telecommunications cables or the lead sheathing. In some cases, the remediation tool includes a first modular section and a second modular section. The first modular section includes a first body portion; a microcontroller device disposed within the first body portion; a connector that extends from a rear portion of the first body portion and that is configured to connect with a compressed air hose that is configured to direct compressed air from an external compressed air source to an interior portion of the remediation tool via the connector; a transducer that is configured to convert motion from compressed air that is input via the connector into electrical power; a power regulation circuit that is configured to convert the electrical power that is output from the transducer into regulated electrical power; and an outlet that is disposed in the rear portion of the first body portion. The second modular section includes a second body portion; and a material removal tool disposed within the second body portion, the material removal tool being configured to remove material from at least one of the inner portion of the lead sheathing or the lead sheathing itself. The remediation tool further includes one or more sensors disposed on or in at least one of the first body portion or the second body portion; a propulsion system that is disposed on or in at least one of the first body portion or the second body portion and that is configured to provide motive force to propel the remediation tool in at least one of a forwards or a backwards direction within the inner portion of the lead sheathing for the installed telecommunications cables; and an interface for removably connecting the first modular section and the second modular section together.

By implementing the systems and techniques described herein for remediation of lead sheathed installed telecommunications cables, lead and other materials in lead sheathed installed telecommunications cables may be safely removed without lingering environmental contamination. With the use of compressed air and transducer-generated electrical power, there is minimal risk in electrocuting any person or animal that accidentally cuts into the remediation tool and/or the tailing compressed air hose. At most, released compressed air may be felt by the affected person or animal.

These and other aspects of the remediation of lead sheathed installed telecommunications cables are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes “a” through “n” may be used, where n denotes any suitable non-negative integer number (unless it denotes the number 14, if there are components with reference numerals having suffixes “a” through “m” preceding the component with the reference numeral having a suffix “n”), and may be either the same or different from the suffix “n” for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term “about.” In this application, the use of the singular includes the plural unless specifically stated otherwise, and use of the terms “and” and “or” means “and/or” unless otherwise indicated. Moreover, the use of the term “including,” as well as other forms, such as “includes” and “included,” should be considered non-exclusive. Also, terms such as “element” or “component” encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase “at least one of element A, element B, or element C” (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a system, including a compressed air hose that is configured to direct compressed air from an external compressed air source to a remediation tool; and the remediation tool that is configured to move within an inner portion of lead sheathing for installed telecommunications cables and to remove material from at least one of the installed telecommunications cables or the lead sheathing. The remediation tool includes a first body portion; a microcontroller device disposed within the first body portion; a connector that extends from a rear portion of the first body portion and that is configured to connect with the compressed air hose; a transducer that is configured to convert motion from compressed air that is input via the connector into electrical power; a power regulation circuit that is configured to convert the electrical power that is output from the transducer into regulated electrical power; a second body portion; one or more sensors disposed on or in at least one of the first body portion or the second body portion; and a material removal tool disposed within the second body portion, the material removal tool being configured to remove material from at least one of the inner portion of the lead sheathing or the lead sheathing itself.

In examples, the microcontroller device includes one of a processor and controller circuitry; a microprocessor circuit; a single-board computer; a single-board microcontroller; or a central processing unit (“CPU”) and controller circuitry; and/or the like. In some examples, the transducer includes one of a fan or micro-turbine and an alternator-based electrical generator that converts motion of blades of the fan or micro-turbine due to the input compressed air into electrical power; or a piezo-electric-based electrical generator that converts force from the input compressed air impinging on a piezo-electric interface component into electrical power; or the like.

In some cases, the compressed air hose includes embedded contact lines for power and ground connections that are configured to provide external power to components of the remediation tool via electrical interface devices disposed at the connector and within at least one of the first body portion or the second body portion. Alternatively or additionally, the compressed air hose includes a plurality of compressed air hoses connected one to the next in series between the external compressed air source and the connector of the remediation tool. In some examples, the first body portion and the second body portion are one of integrated as a single body; or modular components that are configured to removably affix to one another or to a third body portion.

In some embodiments, the material removal tool includes a shredding device including one of a drill bit, a grinder, one or more rotary blades, or one or more auger-based blades, the shredding device being configured to cut and remove cable material and other material within and from the inner portion of the lead sheathing for the installed telecommunications cables. In some instances, the remediation tool further includes an impeller that is configured to direct material, which has been removed from the installed telecommunications cables and which has been cut into pieces by the shredding device, toward the rear portion of the first body portion; and an outlet that is disposed in the rear portion of the first body portion, the outlet allowing the material that is directed by the impeller to exit the remediation tool.

In examples, the system further includes at least one of a sleeve that is affixed to the outlet and that is configured to direct the material and rebounded compressed air that has passed through the outlet back within the lead sheathing toward the external compressed air source; or a filter system that is configured to collect the material that is directed through the outlet by the impeller. Alternatively or additionally, the remediation tool further includes at least one protective enclosure that is configured to cover and protect one or more of the microcontroller device, the connector, the transducer, the power regulation circuit, or the one or more sensors from material moving within an interior of each of the first body portion and the second body portion, while allowing the compressed air to pass through the interior of each of the first body portion and the second body portion.

According to some embodiments, the material removal tool includes a lead removal device including a series of blades that is configured to extend and contract radially to make contact with lead material in the lead sheathing and to remove the lead material from the lead sheathing for the installed telecommunications cables. In some examples, the remediation tool further includes a propulsion system that is configured to provide motive force to propel the remediation tool in at least one of a forwards or a backwards direction within the inner portion of the lead sheathing for the installed telecommunications cables. In some examples, the propulsion system includes a plurality of motorized cogs or wheels that is disposed on an external portion of at least one of the first body portion or the second body portion, or the like. Merely by way of example, in some cases, the one or more sensors include one or more of a humidity sensor, a moisture sensor, a temperature sensor, a pressure sensor, a wind speed sensor, an air flow sensor, a sound sensor, a pH sensor, a soil sensor, a location sensor, a depth sensor, a speed sensor, a power sensor, or an image sensor, and/or the like.

In another aspect, the technology relates to a system, including a remediation tool that is configured to move within an inner portion of lead sheathing for installed telecommunications cables and to remove material from at least one of the installed telecommunications cables or the lead sheathing. The remediation tool includes a first modular section and a second modular section. The first modular section includes a first body portion; a microcontroller device disposed within the first body portion; a connector that extends from a rear portion of the first body portion and that is configured to connect with a compressed air hose that is configured to direct compressed air from an external compressed air source to an interior portion of the remediation tool via the connector; a transducer that is configured to convert motion from compressed air that is input via the connector into electrical power; a power regulation circuit that is configured to convert the electrical power that is output from the transducer into regulated electrical power; and an outlet that is disposed in the rear portion of the first body portion. The second modular section includes a second body portion; and a material removal tool disposed within the second body portion, the material removal tool being configured to remove material from at least one of the inner portion of the lead sheathing or the lead sheathing itself. The remediation tool further includes one or more sensors disposed on or in at least one of the first body portion or the second body portion; a propulsion system that is disposed on or in at least one of the first body portion or the second body portion and that is configured to provide motive force to propel the remediation tool in at least one of a forwards or a backwards direction within the inner portion of the lead sheathing for the installed telecommunications cables; and an interface for removably connecting the first modular section and the second modular section together.

In some embodiments, the second modular section is configured to cut and remove cable material and other material within the inner portion of the lead sheathing for the installed telecommunications cables, and the material removal tool includes a shredding device including one of a drill bit, a grinder, one or more rotary blades, or one or more auger-based blades. In some examples, the remediation tool further includes an impeller that is configured to direct material, which has been removed from the installed telecommunications cables and which has been cut into pieces by the shredding device, toward the rear portion of the first body portion. In some instances, the outlet allows the material that is directed by the impeller to exit the remediation tool.

Alternatively or additionally, the second modular section is configured to remove lead material from the lead sheathing for the installed telecommunications cables, and the material removal tool includes a lead removal device including a series of blades that is configured to extend and contract radially to make contact with lead material in the lead sheathing while cutting and removing the lead material; and a deployable sheath that extends on an end of the remediation tool that is opposite from the connector and that is configured to expand radially to create a collapsible wall and at least a partial seal against the lead sheathing or soil beyond the lead sheathing and to allow compressed air that is directed from the connector to rebound against the collapsible wall back toward the outlet.

According to some embodiments, the remediation tool further includes at least one of a sleeve that is affixed to the outlet and that is configured to direct the material and rebounded compressed air that has passed through the outlet back within the lead sheathing toward the external compressed air source; a filter system that is configured to collect the material that is directed through the outlet by the impeller; or at least one protective enclosure that is configured to cover and protect one or more of the microcontroller device, the connector, the transducer, the power regulation circuit, or the one or more sensors from material moving within the interior portion of the remediation tool, while allowing the compressed air to pass through the interior portion of the remediation tool.

In yet another aspect, the technology relates to a method, including engaging, by a microcontroller device of a remediation tool, a propulsion system that is disposed on or in the remediation tool that has been positioned within an inner portion of lead sheathing for installed telecommunications cables, to cause the remediation tool to be propelled in at least one of a forwards or a backwards direction within the inner portion of the lead sheathing. The propulsion system and the microcontroller device are powered by compressed air that is converted into electrical power by a transducer and a power regulation circuit that are disposed within the remediation tool, the compressed air being directed toward the transducer from an external compressed air source via a compressed air hose and a connecter that extends from a rear portion of the remediation tool. The method further includes engaging, by the microcontroller device, a material removal tool of the remediation tool, to remove material from at least one of the inner portion of the lead sheathing or the lead sheathing itself; engaging, by the microcontroller device, an impeller of the remediation tool, to direct material that has been removed from the at least one of the inner portion of the lead sheathing or the lead sheathing itself toward and through an outlet that is disposed in a rear portion of the remediation tool to exit the remediation tool.

In some examples, the material removal tool includes at least one of a shredding device including one of a drill bit, a grinder, one or more rotary blades, or one or more auger-based blades, the shredding device being configured to cut and remove cable material and other material within and from the inner portion of the lead sheathing for the installed telecommunications cables; or a lead removal device including a series of blades that is configured to extend and contract radially to make contact with lead material in the lead sheathing and to remove the lead material from the lead sheathing for the installed telecommunications cables. In some instances, the remediation tool further includes at least one of a sleeve that is affixed to the outlet and that is configured to direct the material and rebounded compressed air that has passed through the outlet back within the lead sheathing toward the external compressed air source; or a filter system that is configured to collect the material that is directed through the outlet by the impeller.

In examples, the method further includes, when engaging the lead removal device, deploying, by the microcontroller device, a deployable sheath that extends on an end of the remediation tool that is opposite from the connector, to expand radially to create a collapsible wall and at least a partial seal against the lead sheathing or soil beyond the lead sheathing and to allow compressed air that is directed from the connector to rebound against the collapsible wall back toward the outlet.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing telecommunications remediation, and, more particularly, to methods, systems, and apparatuses for implementing remediation of lead sheathed installed telecommunications cables, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 depicts an example system 100 for implementing remediation of lead sheathed installed telecommunications cables, in accordance with various embodiments. In the non-limiting example of FIG. 1, system 100 may include a remediation tool 105, a compressed air hose 110, an external compressed air source 115, installed telecommunications cables 120 that have been installed in the ground 125 under a surface 125*a* of the ground 125 (e.g., at a depth D under the surface 125*a*, or the like), a cap 130 including ports 130*a* and 130*b* for the compressed air hose 110 and an exhaust hose 135*a*, respectively, and an external filter/collector system 135, and/or the like. In examples, the depth D may be any suitable depth including a few inches (or a few centimeters), a few feet (or tens of centimeters or a few meters), etc. Due to ground surface variations, shifting or settling ground, and/or deformations in the lead sheathing 120*a*, the depth D may vary relative to the surface 125*a* along the length of the telecommunications cables 120. In some instances, the length of the installed telecommunications cables 120 may extend underground for several feet (or tens of centimeters or a few meters), several yards (or meters), about a quarter mile (or several hundred meters), about half a mile (or several hundred meters), about a mile (or over a thousand meters), or more.

In some examples, the remediation tool may include a connector 140*a*, an outlet 140*b*, a transducer 145, a power regulation circuit 150, a propulsion system 155, a material removal tool 160, a microcontroller device 165, one or more sensors 170, and/or other components 175, and/or the like. In examples, the installed telecommunications cables 120 include lead sheathing 120*a*, an inner portion of the lead sheathing 120*b*, one or more telecommunications cables 120*c*, and other materials 120*d*. In some cases, the other materials 120*d* may include at least one of adhesive, mastic, resin, dirt, or other materials, and/or the like.

In some embodiments, the connector 140*a* is configured to connect one end of the compressed air hose 110 to the remediation tool. In some examples, the connector 140*a* may include one of a quick connect system (as shown, e.g., in FIGS. 2A-3F, or the like), a twist lock connector system, a screw-type lock connector system, a Luer-lock-type connector system, a bayonet connector system, or other suitable connector system, or the like. The outlet 140*b* is disposed in the rear portion of the remediation tool 105, and is configured or designed to allow material that has been removed from the installed telecommunications cables 120 (e.g., cable material, other material, or lead material of the lead sheathing, etc.) and that has been directed through an interior portion the remediation tool to exit the remediation tool. The transducer 145 is configured to convert motion from compressed air that is input via the connector 140*a* into electrical power. In an example, the transducer 145 may include a fan or micro-turbine and an alternator-based electrical generator that converts motion of blades of the fan or micro-turbine due to the input compressed air into electrical power. In another example, the transducer 145 may include a piezo-electric-based electrical generator that converts force from the input compressed air impinging on a piezo-electric interface component into electrical power.

In some examples, the power regulation circuit 150 is configured to convert the electrical power that is output from the transducer 145 into regulated electrical power. In some cases, the power regulation circuit 150 includes a power storage device (e.g., a super capacitor or a battery, or the like) that stores the converted and regulated electrical power, until capacity of the power storage device has been reached, at which point excess electrical power may be released to ground (e.g., a ground wire or conductive connection to the lead sheathing or to connective ground wires threading around the compressed air hose 110 (for discharge through a corresponding ground connection at the compressed air source 115), or the like). In some instances, the compressed air hose 110 includes embedded contact lines for power and ground connections that are configured to provide external power to components of the remediation tool via electrical interface devices disposed at the connector and within at least one of the first body portion or the second body portion. In some examples, shielded embedded contact lines embedded on or in the compressed air hose may be used to transmit wired communications from the microcontroller device 165 of the remediation tool 105. Alternatively or additionally, the compressed air hose 110 includes a plurality of compressed air hoses connected one to the next in series between the external compressed air source and the connector of the remediation tool.

According to some embodiments, the propulsion system 155 is configured to provide motive force to propel the remediation tool 105 in at least one of a forwards or a backwards direction within the inner portion 120*b* of the lead sheathing 120*a* for the installed telecommunications cables 120. In some examples, the propulsion system 155 includes a plurality of motorized cogs or wheels that is disposed on an external portion of at least one of the first body portion or the second body portion. Alternative structures, as would be understood by a skilled person in the art, may alternatively be used as the propulsion system for propelling the remediation tool 105 forwards or backwards within the inner portion 120*b* of the lead sheathing 120*a*.

In examples, material removal tool 160 is configured to remove material from at least one of the inner portion 120*b* of the lead sheathing 120*a* (e.g., cable material 120*c* and/or other material 120*d*, or the like) or the lead sheathing 120*a* itself. In some embodiments, the material removal tool 160 includes a shredding device 160*a* that is configured to cut and remove cable material 120*c* and other material 120*d* within and from the inner portion 120*b* of the lead sheathing 120*a* for the installed telecommunications cables 120. In some examples, the shredding device 160*a* includes one of a drill bit, a grinder, one or more rotary blades, or one or more auger-based blades, and/or the like. Alternatively, the material removal tool 160 includes a lead removal device 160*b* including a series of blades that is configured to extend and contract radially to make contact with lead material in the lead sheathing 120*a* and to remove the lead material from the lead sheathing 120*a* for the installed telecommunications cables 120. In some instances, the material removal tool further includes an impeller 160*c* that is configured to direct material, which has been removed from the installed telecommunications cables and which has been cut into pieces by the shredding device 160*a* and/or the lead removal device 160*b*, through an interior portion of the remediation tool toward a rear portion or the outlet 140*c* of the remediation tool, to direct the material to exit the remediation tool. As shown and described below with respect to FIGS. 3A-4, the material removal tool 160 and/or the other components 175 may further include a deployable sheath that is used in conjunction with the lead removal device 160*b* and that extends on an end of the remediation tool 105 that is opposite from the connector 140*a*, to expand radially to create a collapsible wall and at least a partial seal against the lead sheathing 120*a* or soil beyond the lead sheathing 120*a* and to allow compressed air that is directed from the connector 140*a* to rebound against the collapsible wall back toward the outlet 140*c*.

In some examples, the microcontroller device 165 includes one of: a processor and controller circuitry; a microprocessor circuit; a single-board computer; a single-board microcontroller; or a central processing unit ("CPU") and controller circuitry; and/or the like. The microcontroller device 165 is configured to control at least one of the propulsion system 155, the material removal tool 160, the one or more sensors 170, and/or the other components 175. Merely by way of example, in some cases, the one or more sensors 170 include one or more of a humidity sensor, a moisture sensor, a temperature sensor, a pressure sensor, a wind speed sensor, an air flow sensor, a sound sensor, a pH sensor, a soil sensor, a location sensor, a depth sensor, a speed sensor, a power sensor, or an image sensor, and/or the like.

Other components 175 may include one or more solenoids, one or more relays, one or more modular sections, a skirt or sleeve, a filter, and/or a wireless transceiver, or the like. In some cases, the one or more solenoids may be configured to deploy and/or retract the deployable sheath and/or the lead removal device 160*b*. In other cases, the one or more solenoids may be configured to deploy and/or retract a striker for tapping the lead sheathing to generate sounds that can be tracked by a user who is using an audio sensor-based tracker above ground and who is controlling, tracking, or monitoring the remediation tool 105. In some instances, the one or more relays may be deposited at set or predetermined intervals within the length of the inner portion 120*b* of the lead sheathing, the one or more relays being configured to relay wired or wireless communications between the remediation tool 105 and a user device operated by the user. In some examples, the one or more modular sections may include a section(s) for housing the propulsion system, a section(s) for housing the electronics (e.g., the microcontroller device 165, the transducer 145, the power regulation circuit 150, the wireless transceiver, etc.), a section(s) for housing the connector 140*a*, the outlet 140*b*, the skirt or sleeve, the filter, etc., a section(s) to house the impeller 160*c*, a section(s) to house the shredding device 160*a*, a section(s) to house the lead removal device 160*b*, a section(s) to house the deployable sheath, a section(s) to house the one or more sensors, and/or the like. In some cases, two or more of these sections may be integrated into a single modular section for connecting with one or more other modular sections.

According to some embodiments, the skirt or sleeve may be affixed to the outlet 140*b* and may be configured to direct the material and rebounded compressed air that has passed through the outlet back within the lead sheathing toward the external compressed air source 115 and into the exhaust hose 135*a* and the external filter/collector system 135. In some examples, the skirt or sleeve may be made of material including polyethylene, polyurethane, polyvinyl chloride, nylon, or chlorosulfonated polyethylene ("CSPE") synthetic rubber ("CSM"; also referred to as Hypalon®), or the like. In examples, the filter may be configured to collect material that is directed through the outlet 140*b* by the impeller 160*c*, and either may be affixed or integrated with the skirt or sleeve, or may be part of the external filter/collector system 135. The wireless transceiver may be configured to enable wirelessly connectivity with a user device associated with the user who is controlling, tracking, or monitoring the remediation tool 105. In examples, the wireless transceiver may utilize or may operate under any of the IEEE 802.11 suite of protocols, the Bluetooth™ protocol known in the art, and/or any other wireless protocol. In some examples, the user device may include one of a smart phone, a tablet computer, a laptop computer, a dedicated service provider portable control device, or the like.

In some embodiments, although not shown, the remediation tool may include multiple segments connected by accordion-like connectors that as a whole enable multiple points of articulation for achieving snakelike bendability or flexibility through any bends in the lead sheathing through which the remediation tool must traverse. Alternative structures, as would be understood by a skilled person in the art, may alternatively be used to achieve similar bendability or flexibility. In examples, each of the modular sections described above may include multiple segments or may correspond to one of these multiple segments.

Figure 2A:
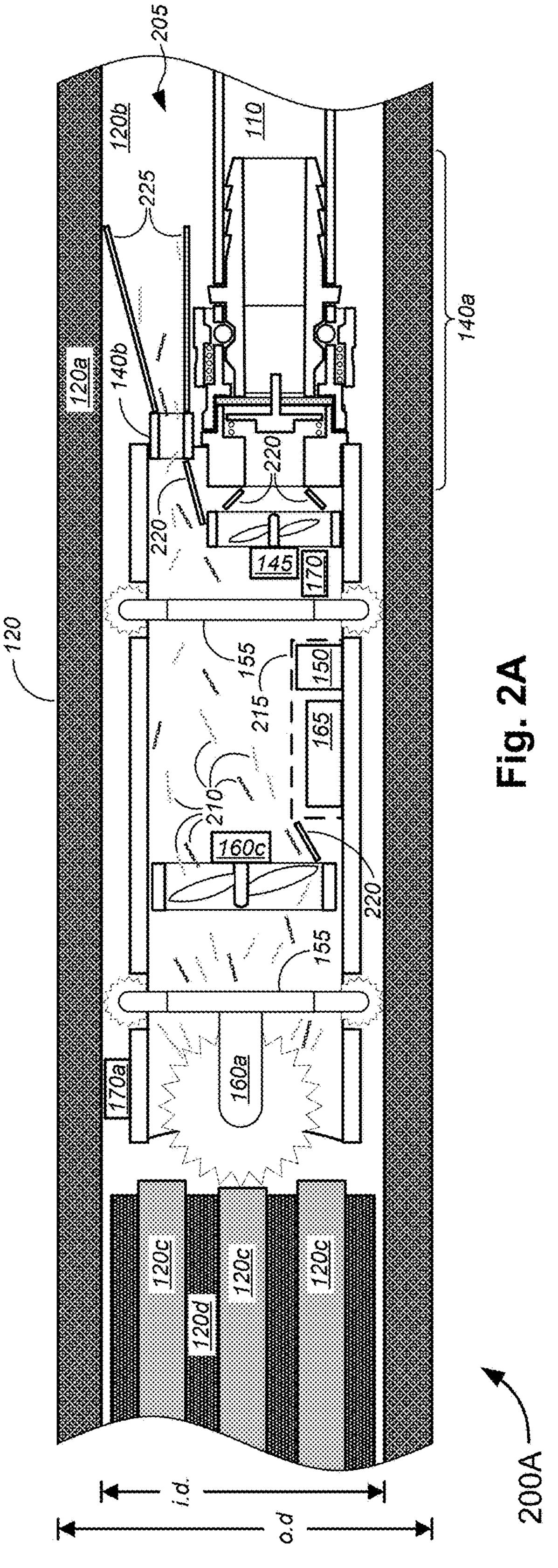
FIGS. 2A and 2B depict plan cross-sectional views of various example remediation tools that may be used for removing cable and/or other material within and from an inner portion of lead sheathing for installed telecommunications cables when implementing remediation of lead sheathed installed telecommunications cables, in accordance with various embodiments.
Figure 2B:
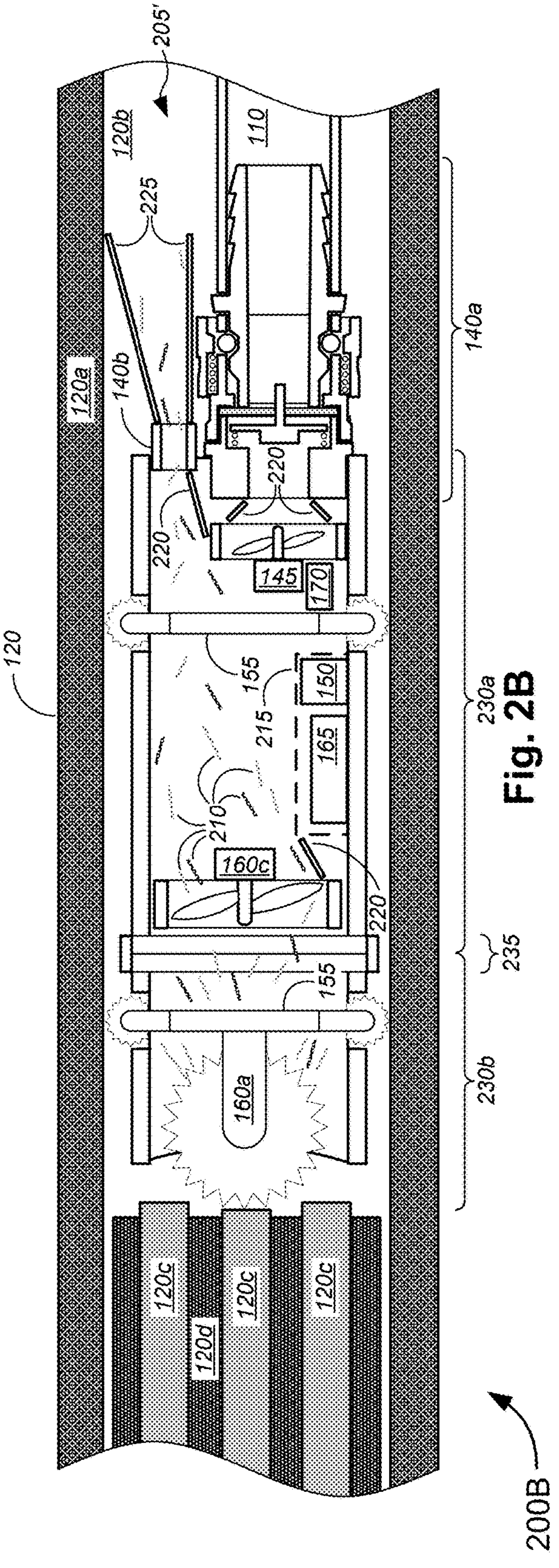
Figures 3A, 3D:
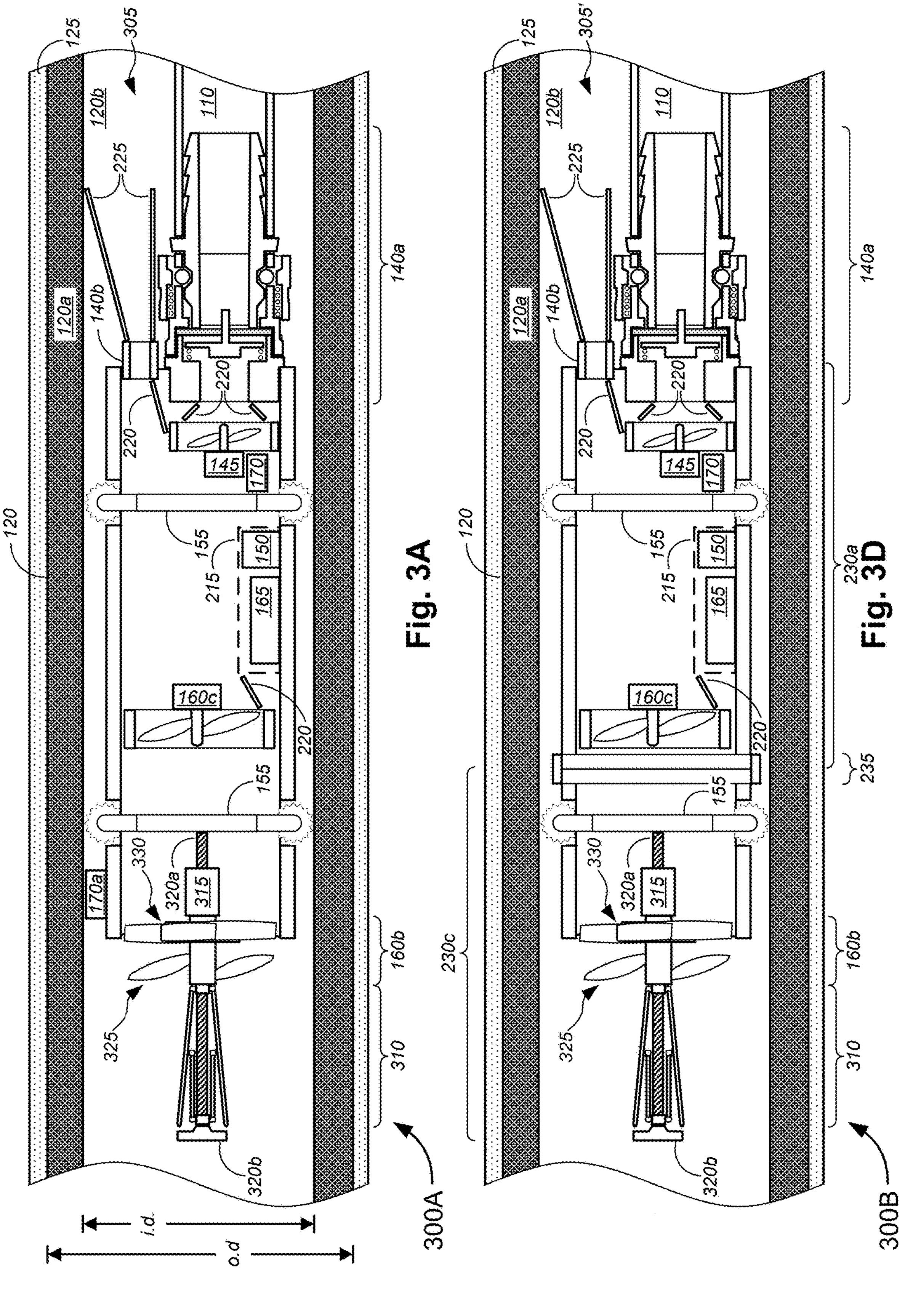
FIGS. 3A-3F depict plan cross-sectional views of various example remediation tools, shown at different stages of deployment, that may be used for removing lead material from lead sheathing for installed telecommunications cables when implementing remediation of lead sheathed installed telecommunications cables, in accordance with various embodiments.
Figure 3B:
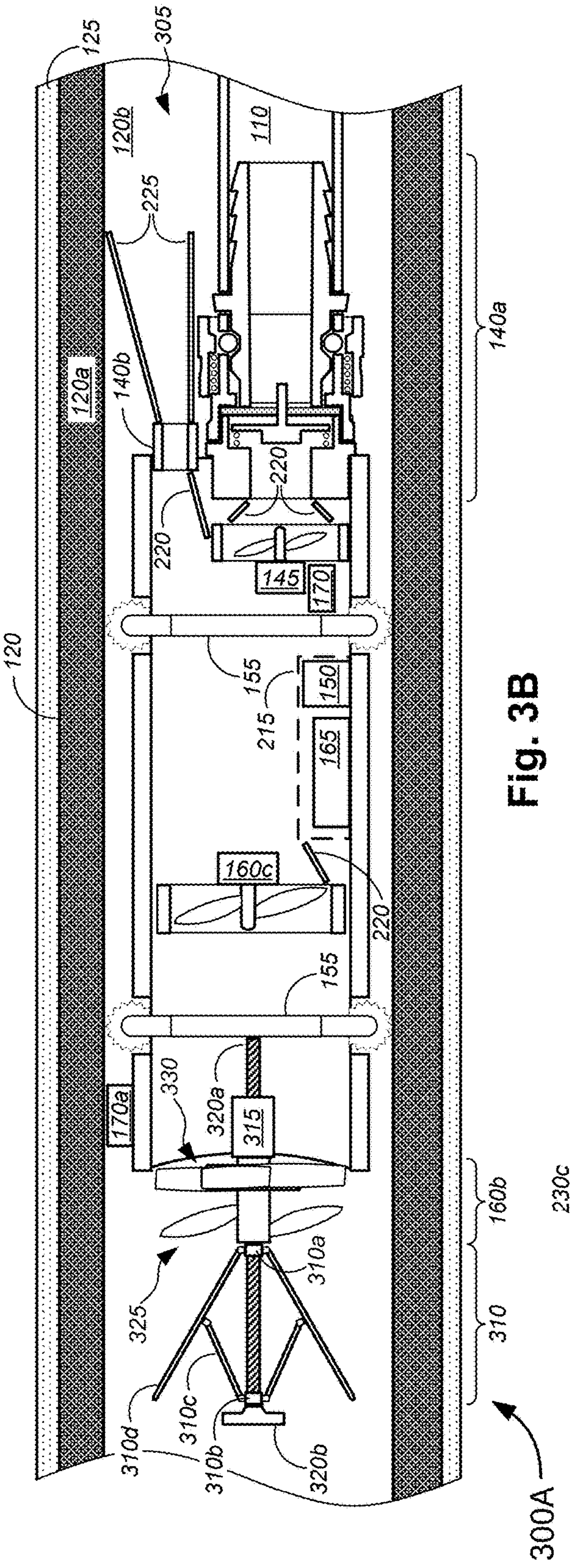
Figure 3E:
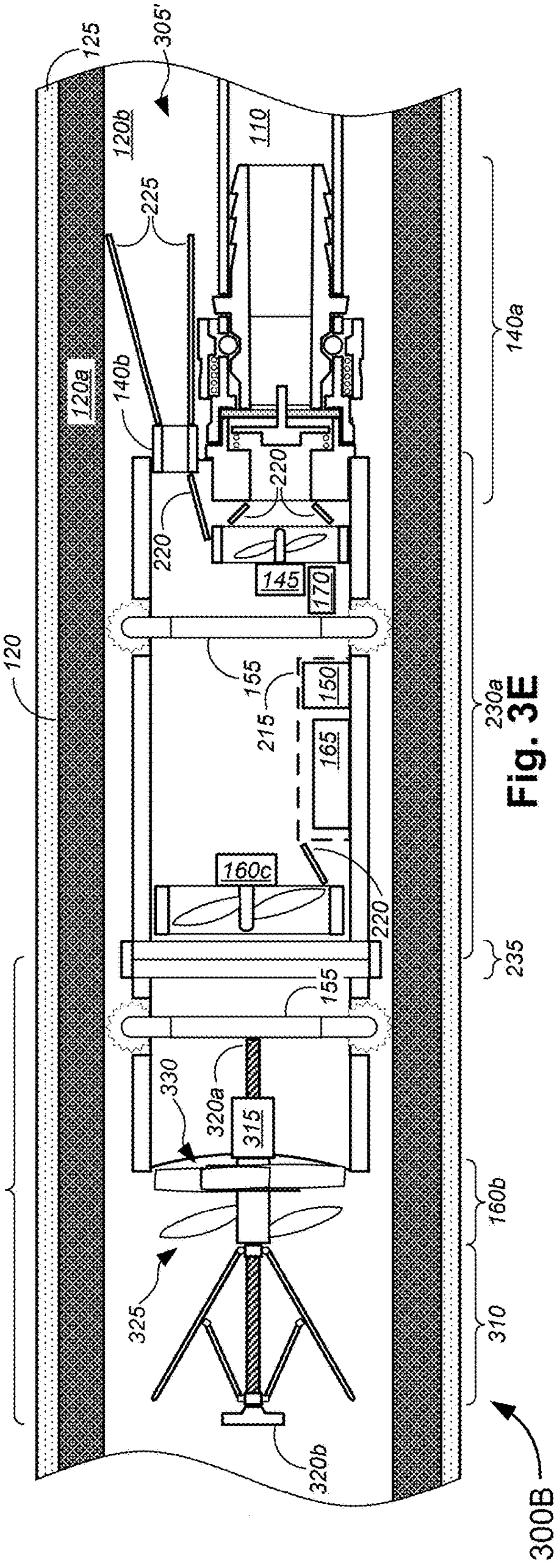
Figure 3C:
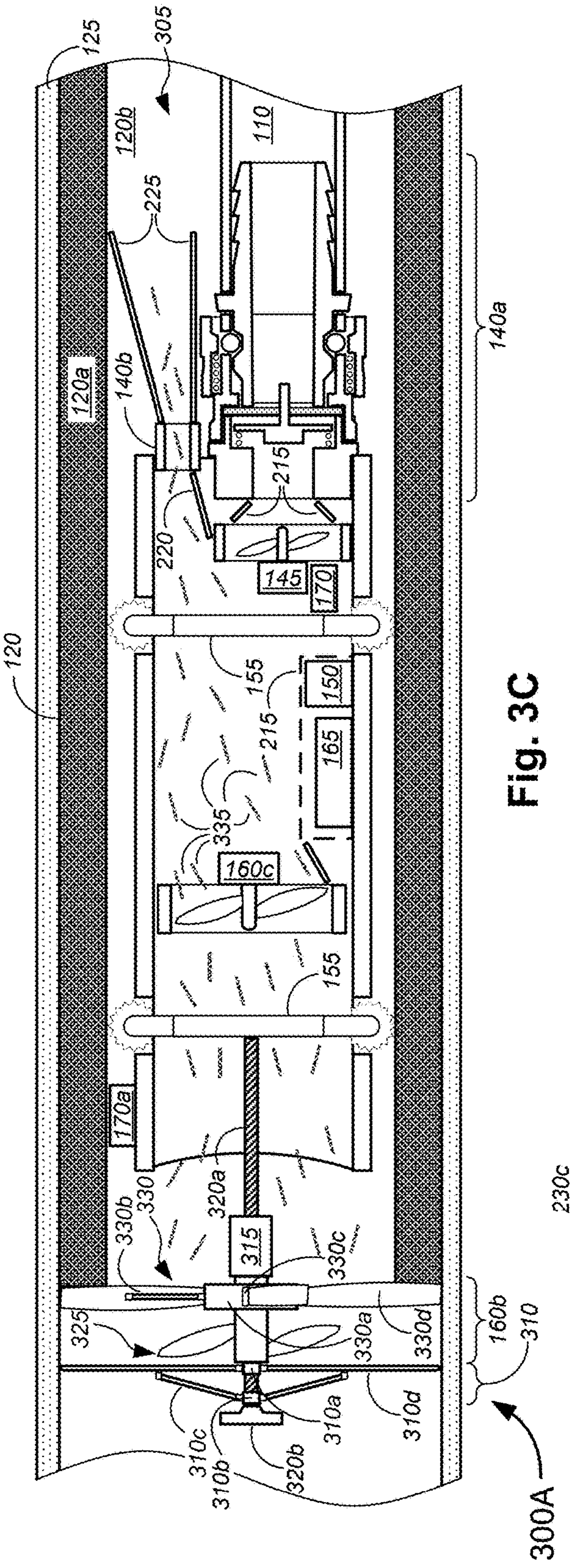
Figure 3F:
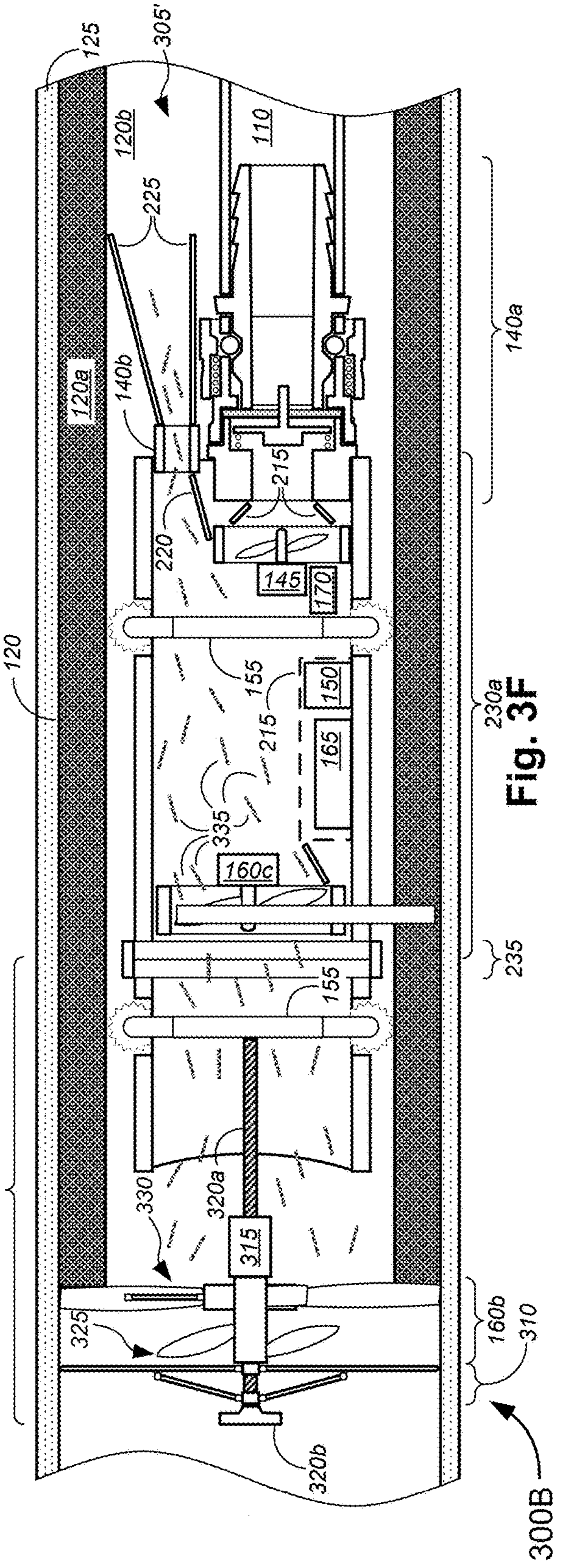
Figure 4:
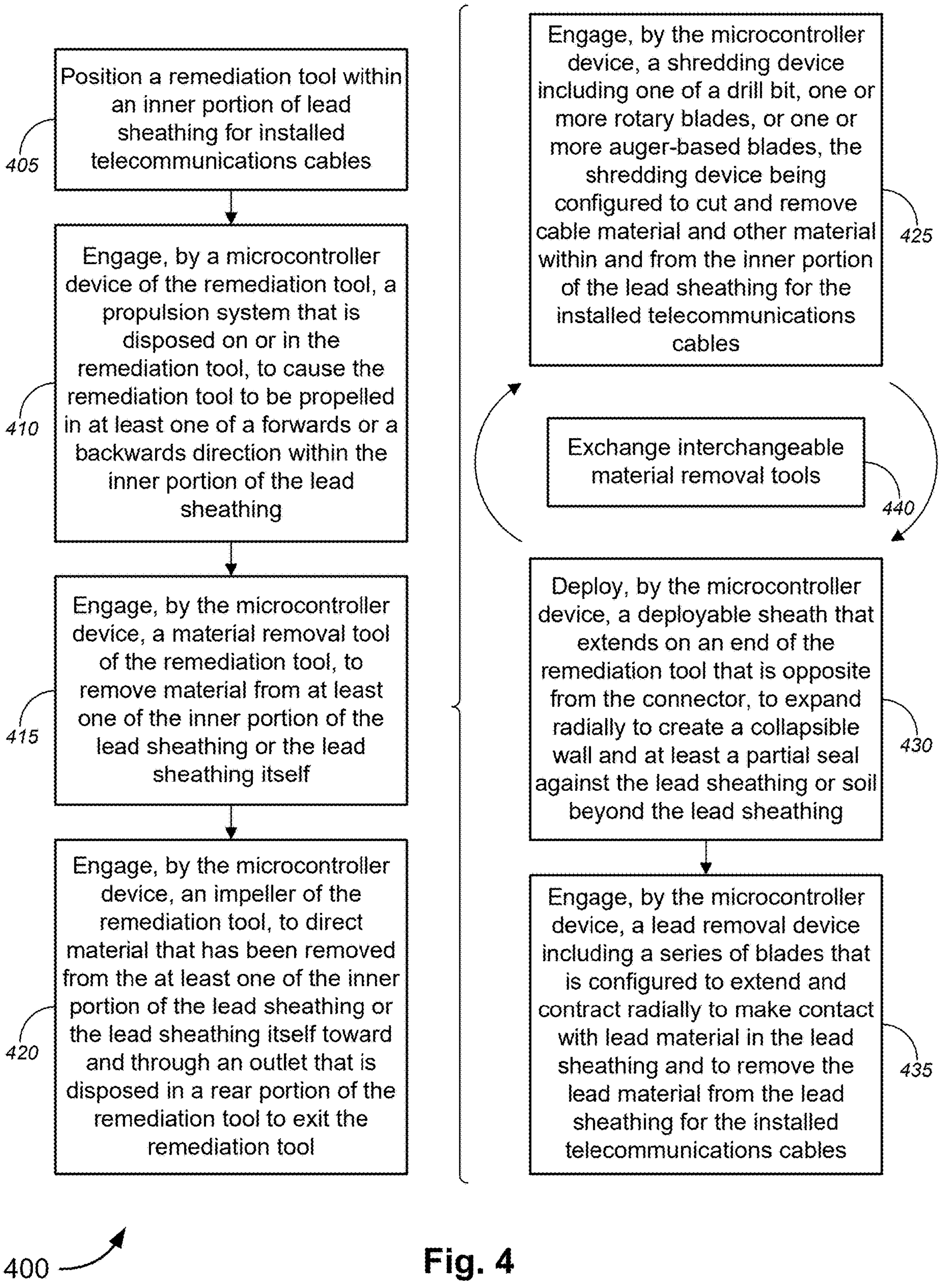
FIG. 4 depicts a flow diagram illustrating a method for implementing remediation of lead sheathed installed telecommunications cables, in accordance with various embodiments.

In operation, the microcontroller device 165 may perform methods for implementing remediation of lead sheathed installed telecommunications cables, as described in detail with respect to FIGS. 2-4. For example, various example configurations of the remediation tool 105 are shown and described below with respect to FIGS. 2A and 2B corresponding to removal of cable and/or other material within and from an inner portion of lead sheathing for installed telecommunications cables, and with respect to FIGS. 3A-3F corresponding to removal of lead material from lead sheathing for installed telecommunications cables. The method for implementing remediation of lead sheathed installed telecommunications cables as shown and described below with respect to FIG. 4 may be applied with respect to the operations of system 100 of FIG. 1.

FIGS. 2A and 2B (collectively, "FIG. 2") depict plan cross-sectional views of various example remediation tools 200A and 200B that may be used for removing cable and/or other material within and from an inner portion of lead sheathing for installed telecommunications cables when implementing remediation of lead sheathed installed telecommunications cables (e.g., copper cables or wires, etc.), in accordance with various embodiments.

In some embodiments, remediation tool 205 or 205', compressed air hose 110, installed telecommunications cables 120, lead sheathing 120*a*, inner portion 120*b*, cable material 120*c*, other material 120*d*, connector 140*a*, outlet 140*b*, transducer 145, power regulation circuit 150, propulsion system 155, shredding device 160*a*, impeller 160*c*, microcontroller device 165, and sensors 170 and 170*a* of FIG. 2 may be similar, if not identical, to the remediation tool 105, compressed air hose 110, installed telecommunications cables 120, lead sheathing 120*a*, inner portion 120*b*, cable material 120*c*, other material 120*d*, connector 140*a*, outlet 140*b*, transducer 145, power regulation circuit 150, propulsion system 155, shredding device 160*a*, impeller 160*c*, microcontroller device 165, and sensors 170, respectively, of system 100 of FIG. 1, and the description of these components of system 100 of FIG. 1 are similarly applicable to the corresponding components of FIG. 2. In some examples, the inner diameter ("i.d.") of the lead sheathing 120*a* may be about 1 inch (or about 2.54 cm), with the outer diameter ("o.d.") being about 1¼ inch (or about 3.18 cm) or 1⅜ inch (or about 3.49 cm), which requires the remediation tool 205 to be of a size having an outer diameter that is less than the about 1 inch i.d., with wheels or cogs extending to the i.d. In other examples, the o.d. is about 1 inch (or about 2.54 cm), with the i.d. being about ¾ inch (or about 1.91 cm) or about ⅞ inch (or about 2.22 cm), which requires the remediation tool 205 to be of a size having an outer diameter that is less than the about ¾ inch i.d. or less than the about about ⅞ inch i.d., with wheels or cogs extending to the i.d.

With reference to the non-limiting example 200A of FIG. 2A, after a compressed air hose 110 has been connected from an external compressed air source to the connector 140*a* of the remediation tool 205, and after the remediation tool 205 has been positioned within an inner portion 120*b* of lead sheathing 120*a* for installed telecommunications cables 120, the remediation tool 205 may be used to cut and remove cable material 120*c* and/or other material 120*d* using shredding device 160*a*. In particular, compressed air is flowed or caused to flow from the external compressed air source (e.g., compressed air source 115 of FIG. 1, or the like) through the compressed air hose 110 into an interior portion of the remediation tool 205, via connector 140*a*. Although FIG. 2A depicts a non-limiting example of a quick connect system for connector 140*a*, the various embodiments are not so limited, and any other suitable connector-including a twist lock connector system, a screw-type lock connector system, a Luer-lock-type connector system, or a bayonet connector system, or the like—may be used. The compressed air is then flowed or directed into an input portion of transducer 145, in some cases, with the aid of deflectors or nozzles 220. Although FIG. 2A depicts a non-limiting example of a fan or micro-turbine and an alternator-based electrical generator for the transducer 145 that converts, into electrical power, motion of blades of the fan or micro-turbine due to the input compressed air, the various embodiments are not so limited, and any other suitable transducer—including a piezo-electric-based electrical generator that converts force from the input compressed air impinging on a piezo-electric interface component into electrical power, or the like—may be used. In some cases, a sensor 170 (e.g., a wind speed sensor, an air flow sensor, or the like) may be used to monitor or detect the speed of the compressed air impinging upon the transducer 145.

Electrical power generated by the transducer 145 may be regulated using power regulation circuit 150. In some cases, power regulation circuit 150 may include a power storage device (e.g., a super capacitor or a battery, or the like) that stores the converted and regulated electrical power. The regulated or stored electrical power may be used by the electronics that are disposed within or on the remediation tool 205, such as the microcontroller device 165, the sensors 170, 170*a*, the power regulation circuit 150, the propulsion system 155, the impeller 160*c*, and the shredding device 160*a*. The microcontroller device 165 controls the propulsion system 155, the impeller 160*c*, and the shredding device 160*a*, in some cases, based on instructions received from a user (e.g., via wireless communications, in some instances, via one or more relays, or via wired communications, in some cases, via shielded embedded contact lines embedded on or in the compressed air hose, each as described above with respect to FIG. 1, or the like), and in some cases, based on sensor data obtained from one or more sensors 170 and/or 170*a* (e.g., image sensor(s). humidity or moisture sensor(s), temperature sensor(s), pressure sensor(s), wind speed or air flow sensor(s), soil sensor, location sensor, depth sensor, speed sensor, power sensor, or the like). For example, based on image sensor data, humidity/moisture sensor data, and/or soil sensor data, the microcontroller or an external computing system (e.g., user device as described above with respect to FIG. 1, or the like), it may be determined that a leak has formed in the lead sheathing 120*a*. Based on such determination, the microcontroller device 165 and/or the external user device may cause the propulsion system 155 to avoid the affected area, to backtrack back to its starting position, or to push through the affected area using the shredding device 160*a*.

In examples, the propulsion system 155 includes a plurality of motorized cogs or wheels that is disposed on an external portion of the remediation tool 205. Cogs with teeth may be used to press (and generate traction) against the interior lead surface of the lead sheathing 120*a*. Wheels with treading may alternatively be used to generate traction against the interior lead surface of the lead sheathing 120*a*. In some examples, four, six, or eight motorized cogs or wheels for each set of motorized cogs or wheels may be distributed (in some cases, equidistantly) about a circumference of the remediation tool 205. In an example, one set of motorized cogs or wheels may be used. In another example, two or more sets of motorized cogs or wheels may be spaced apart along the longitudinal direction of the remediation tool 205. For instance, two sets of motorized cogs are shown in the non-limiting example 200A of FIG. 2A.

In some examples, shredding device 160*a* may be engaged as the propulsion system 155 propels the remediation tool 205 forward against cable material 120*c* and/or other materials, and the impeller 160*c* and deflectors 220 are used to direct the cut and removed material within the interior portion of the remediation tool 205 toward the rear portion of the remediation tool 205, and through outlet 140*b*, to exit the remediation tool 205. In some cases, sleeve 225 may affixed to the outlet 140*b*, and may be used to direct the material 210 and rebounded compressed air that has passed through the outlet 140*b* back within the lead sheathing 120*a* toward the external compressed air source (e.g., compressed air source 115, or the like, and into the exhaust hose 135*a* and the external filter/collector system 135 of FIG. 1, or the like). As the pressure builds up near the front portion of the remediation tool or in front of the remediation tool due to the compressed air being directed through the connector 140*a* toward the front of the remediation tool, lower pressure develops behind the remediation tool, which may cause a vacuum effect that draws, at least in part, some of the rebounded compressed air and the material 210 through the outlet 140*b* and through the sleeve 225, to exit the remediation tool 205. In some examples, a filter/collector bag or sleeve may be used in conjunction with the sleeve 225, where the filter/collector bag or sleeve serves a similar function as filter/collector 135, except that it is disposed within the inner portion 120*b* of the lead sheathing 120*a*. To protect the electronics (such as the microcontroller device 165, the power regulation circuit 150, and/or the like), a protective enclosure or cage 215 may be used, in some cases, in conjunction with one or more deflectors 220. Although FIG. 2A depicts a non-limiting example of a rotary blade-based system for the shredding device 160*a*, the various embodiments are not so limited, and any other suitable shredding device—including a drill bit-based system (either a single-headed bit or multi-headed bit), a grinder-based system, or an auger-based system (with a single augur blade or multiple augur blades), and/or the like—may be used.

Turning to non-limiting example 200B of FIG. 2B, remediation tool 205' is similar, if not identical, to remediation tool 205 of FIG. 2A, except that where remediation tool 205 is embodied as a single-bodied or single-section device from front portion to rear portion, remediation tool 205' is embodied as modular sections that are configured to removably affix to one another to form the remediation tool 205'. As shown in FIG. 2B, remediation tool 205' includes a first modular section, which includes a first body portion 230*a*, microcontroller device 165 disposed within the first body portion 230*a*, connector 140*a* that extends from a rear portion of the first body portion 230*a*, transducer 145 that is positioned forward relative to the connector 140*a* within the first body portion 230*a*, power regulation circuit 150 that is positioned within the first body portion 230*a*, impeller 160*c* that is positioned within the first body portion 230*a*, and outlet 140*b* that is disposed in the rear portion of the first body portion 230*a*, with sleeve 225 extending from and affixed to the outlet 140*b*. The second modular section includes a second body portion 230*b* and material removal tool 160*a* disposed within the second body portion 230*b*. Although sensors 170 and 170*a* (where remediation tool 205 is shown having sensor 170*a*, while remediation tool 205' is shown without sensor 170*a*) are shown disposed on or in at least one of the first body portion 230*a* or the second body portion 230*b*, any suitable positioning of the sensors may be implemented within or on one or more body portions or modular sections. In FIGS. 2A and 2B, propulsion system 155 is shown disposed on or in at least one of the first body portion or the second body portion, although any suitable positioning of propulsion 155 across one or more body portions or modular sections may be implemented. Interface 235 is used for removably connecting the first modular section and the second modular section together.

FIGS. 3A-3F (collectively, "FIG. 3") depict plan cross-sectional views of various example remediation tools, shown at different stages of deployment, that may be used for removing lead material from lead sheathing for installed telecommunications cables when implementing remediation of lead sheathed installed telecommunications cables, in accordance with various embodiments.

In some embodiments, remediation tool 305 or 305', compressed air hose 110, installed telecommunications cables 120, lead sheathing 120*a*, inner portion 120*b*, ground 125, connector 140*a*, outlet 140*b*, transducer 145, power regulation circuit 150, propulsion system 155, lead removal device 160*b*, impeller 160*c*, microcontroller device 165, and sensors 170 and 170*a* of FIG. 3 may be similar, if not identical, to the remediation tool 105, compressed air hose 110, installed telecommunications cables 120, lead sheathing 120*a*, inner portion 120*b*, ground 125, connector 140*a*, outlet 140*b*, transducer 145, power regulation circuit 150, propulsion system 155, impeller 160*c*, microcontroller device 165, and sensors 170, respectively, of system 100 of FIG. 1, and the description of these components of system 100 of FIG. 1 are similarly applicable to the corresponding components of FIG. 3. According to some embodiments, remediation tool 305 or 305', compressed air hose 110, installed telecommunications cables 120, lead sheathing 120*a*, inner portion 120*b*, connector 140*a*, outlet 140*b*, transducer 145, power regulation circuit 150, propulsion system 155, impeller 160*c*, microcontroller device 165, sensors 170 and 170*a*, protective enclosure 215, deflectors 220, and sleeve 225 of FIG. 3 may be similar, if not identical, to the remediation tool 205 or 205', compressed air hose 110, installed telecommunications cables 120, lead sheathing 120*a*, inner portion 120*b*, connector 140*a*, outlet 140*b*, transducer 145, power regulation circuit 150, propulsion system 155, lead removal device 160*b*, impeller 160*c*, microcontroller device 165, sensors 170 and 170*a*, protective enclosure 215, deflectors 220, and sleeve 225, respectively, of example 200 of FIG. 2, and the description of these components of FIG. 2 are similarly applicable to the corresponding components of FIG. 3.

FIGS. 3A-3C correspond to the single-bodied embodiment of FIG. 2A, while FIGS. 3D-3F correspond to the modular, multi-segment embodiment of FIG. 2B. Where embodiments 200A and 200B of FIGS. 2A and 2B implement the shredding device 160*a*, embodiments 300A and 300B of FIGS. 3A-3C and 3D-3F implement the lead removal device 160*b* (as well as deployable sheath 310). As shown in FIGS. 3A-3F, compared with FIGS. 2A and 2B, shredding device 160*a* of remediation tool 205, 205' is replaced, in remediation tool 305, 305', with lead removal device 160*b* (including fan-based drive 325 and radially deployable blades 330), deployable sheath 310, motorized actuator 315, shaft 320*a*, and end-cap 320*b*.

As shown in FIG. 3A or 3D, in the undeployed state, remediation tool 305, 305' may be positioned within the inner portion 120*b* of lead sheathing 120*a*, after the cable material 120*c* and other 120*d* (of FIGS. 2A and 2B) have been completely or substantially removed. In some examples, the remediation tool 305, 305' may be instructed to traverse the length of the substantially emptied lead sheathing to a far end (opposite from its starting position that is closest to the cap 130, the external compressed air source 115, and/or the exhaust hose 135*a* and the external filter/collector system 135 (of FIG. 1). Once at the far end, which may be verified using sensor data collected by sensor(s) 170 or 170*a* (e.g., image sensor data or location sensor data, etc.), the microcontroller device 165 may instruct the motorized actuator 315 to push the lead removal device 160*b* and a movable cap 310*a* of the deployable sheath 310 forward toward the end-cap 320*b* (and toward its stationary cap 310*b*), thereby extending the radially deployable blades 330 beyond a front opening of the remediation tool 305, 305', as shown in FIG. 3B or 3E. As the movable cap 310*a* of the deployable sheath 310 moves towards its stationary cap 310*b*, pivotable struts 310*c* and sheath portion 310*d* extend radially outward toward an inner surface of the lead sheathing 120*a*. When the motorized actuator 315 pushes the lead removal device 160*b* and the movable cap 310*a* of the deployable sheath 310 such that the movable cap 310*a* reaches its maximum movable distance (which may correspond to contact with a stopper that is positioned along the shaft 320*a* at the suitable distance (not shown)), the sheath portion 310*d* extends to its maximum radially extension. In an example, the sheath portion 310*d* may include single segment struts that do not change in length. In another example, the sheath portion 310*d* may include spring-loaded, telescoping struts that, when spring-extended is set to its longest length, while contours of the ground 125 and/or the lead sheathing 120*a* cause the spring to compress, thereby shortening the affected spring-loaded, telescoping struts, and thus allowing for improved contouring of the sheath portion 310*d* to form a collapsible wall and at least a partial seal against the lead sheathing 120*a* or the soil in the ground 125 beyond the lead sheathing 120*a*.

With the collapsible wall of the deployable sheath 310 fully deployed, compressed air flowing from the connector 140*a* may cause the fan-based drive 325, which may be fixedly attached to a spindle portion 330*a* of the radially deployable blades 330, to rotate, thereby rotating the spindle portion 330*a*, which may cause the struts 330*b* and the blades 330*d* to spring outward about corresponding hinges or pivot points 330*c* due to centrifugal force. Continued rotation of the spindle portion 330*a* (caused by rotation of the fan-based drive 325) may cause the blades 330*d* to cut and remove a portion of the lead sheathing 120*a* that the blades 330*d* make contact with. In some cases, a layer of soil (which may contain traces of the lead, due to leaching or contact transferring, or the like) may also be removed in a similar manner. The collapsible wall and at least a partial seal allow for rebounding of the compressed air to push the removed lead material 335 (as well as some soil) to move toward (and through) the outlet 140*b* at the rear portion of the remediation tool 305, 305'. In some examples, the impeller 160*c* may be used to facilitate movement of the removed lead material 335 (along with some soil) toward (and through) the outlet 140*b*.

Alternative to the centrifugal deployment of the struts 330*b* and blades 330*d*, motorized actuator 315 may include a secondary actuator to trigger radial deployment of the struts 330*b* and blades 330*d*. In some cases, the secondary actuator may also be used to trigger radial collapse of the struts 330*b* and blades 330*d* for post-removal operations. During the post-removal operations, the motorized actuator 315 may be instructed to pull the lead removal device 160*b* and the movable cap 310*a* of the deployable sheath 310 rearward, thereby collapsing the deployable sheath 310 and moving the blades 330*d* to its starting position within the front opening, as shown in FIG. 3A or 3D.

In the manner as described above with respect to FIGS. 1-3, lead and other materials in lead sheathed installed telecommunications cables may be safely removed without lingering environmental contamination.

FIG. 4 depicts flow diagrams illustrating a method 400 for implementing remediation of lead sheathed installed telecommunications cables, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200A, 200B, 300A, and 300B of FIGS. 1, 2A, 2B, 3A-3C, and 3D-3F, respectively (or components thereof), such methods may also be implemented using any suitable hardware (or software) implementation. Similarly, while each of the systems, examples, or embodiments 100, 200A, 200B, 300A, and 300B of FIGS. 1, 2A, 2B, 3A-3C, and 3D-3F, respectively (or components thereof), can operate according to the method 400 illustrated by FIG. 4 (e.g., by executing instructions embodied on a computer readable medium), the systems, examples, or embodiments 100, 200A, 200B, 300A, and 300B of FIGS. 1, 2A, 2B, 3A-3C, and 3D-3F can each also operate according to other modes of operation and/or perform other suitable procedures.

As an initial matter, a first end of a compressed air hose is connected to an external compressed air source, while a second end of the compressed air hose is connected to a connecter that extends from a rear portion of a remediation tool. Method 400 may then proceed as shown and described below with respect to the non-limiting embodiment of FIG. 4. Method 400, at operation 405, may include positioning the remediation tool (such as remediation tool 105, 205, 205', 305, or 305' of FIG. 1, 2A, 2B, 3A-3C, or 3D-3F, respectively, or the like) within an inner portion of lead sheathing (e.g., lead sheathing 120*a* of FIGS. 1-3, or the like) for installed telecommunications cables (e.g., cables 120 of FIGS. 1-3, or the like). At operation 410, method 400 includes engaging, by a microcontroller device of the remediation tool, a propulsion system that is disposed on or in the remediation tool, to cause the remediation tool to be propelled in at least one of a forwards or a backwards direction within the inner portion of the lead sheathing. In examples, the propulsion system and the microcontroller device may be powered by compressed air that is converted into electrical power by a transducer and a power regulation circuit that are disposed within the remediation tool, the compressed air being directed toward the transducer from the external compressed air source via the compressed air hose and the connecter that extends from the rear portion of the remediation tool. In some examples, the propulsion system may include a plurality of motorized cogs or wheels that is disposed on an external portion of the remediation tool.

Method 400, at operation 415, includes engaging, by the microcontroller device, a material removal tool of the remediation tool, to remove material from at least one of the inner portion of the lead sheathing or the lead sheathing itself. Method 400 may further include engaging, by the microcontroller device, an impeller of the remediation tool, to direct material that has been removed from the at least one of the inner portion of the lead sheathing or the lead sheathing itself toward and through an outlet that is disposed in a rear portion of the remediation tool to exit the remediation tool.

In some embodiments, engaging the material removal tool (at operation 415) may include engaging, by the microcontroller device, a shredding device including one of a drill bit, a grinder, one or more rotary blades, or one or more auger-based blades, and/or the like (at operation 425). Although FIGS. 2A and 2B depict a rotary blade-based shredding device, other types of shredding devices may alternatively or additionally be used. The shredding device is configured to cut and remove cable material and other material within and from the inner portion of the lead sheathing for the installed telecommunications cables.

Alternatively, engaging the material removal tool (at operation 415) may include deploying, by the microcontroller device, a deployable sheath that extends on an end of the remediation tool that is opposite from the connector, to expand radially to create a collapsible wall and at least a partial seal against the lead sheathing or soil beyond the lead sheathing and to allow compressed air that is directed from the connector to rebound against the collapsible wall back toward the outlet (at operation 430); and engaging, by the microcontroller device, a lead removal device including a series of blades that is configured to extend and contract radially to make contact with lead material in the lead sheathing and to remove the lead material from the lead sheathing for the installed telecommunications cables (at operation 435).

In the embodiments in which the remediation tool includes modular components (such as shown and described above with respect to FIGS. 2B and 3D-3F, or the like), method 400 may further include, at operation 440, exchanging interchangeable material removal tools and/or interchangeable modular sections of the remediation tool when switching between (a) removing the cable material and other material from the inner portion of the lead sheathing for the installed telecommunications cables (e.g., as shown in FIG. 2B, or the like) and (b) removing the lead material in the lead sheathing itself (e.g., as shown in FIGS. 3D-3F, or the like).

For remediation tools that do not include modular or interchangeable components, exchanging the material removal tools (at operation 440) may include removing a first remediation tool having the shredding device integrated therein or thereon; disconnecting the compressed air hose from the connector of the first remediation tool; connecting the compressed air hose to a corresponding connector of a second remediation tool having the deployable sheath and the lead removal device integrated therein or thereon; and repeating the processes at operations 405-420 and 430-435 using the second remediation tool. For the next remediation task for a different set of installed telecommunications cables, exchanging the material removal tools (at operation 440) may include removing the second remediation tool having the deployable sheath and the lead removal device integrated therein or thereon; disconnecting the compressed air hose from the connector of the second remediation tool; connecting the compressed air hose to the corresponding connector of the first remediation tool having the shredding device integrated therein or thereon; and repeating the processes at operations 405-425 using the first remediation tool.

Exemplary System and Hardware Implementation

Figure 5:
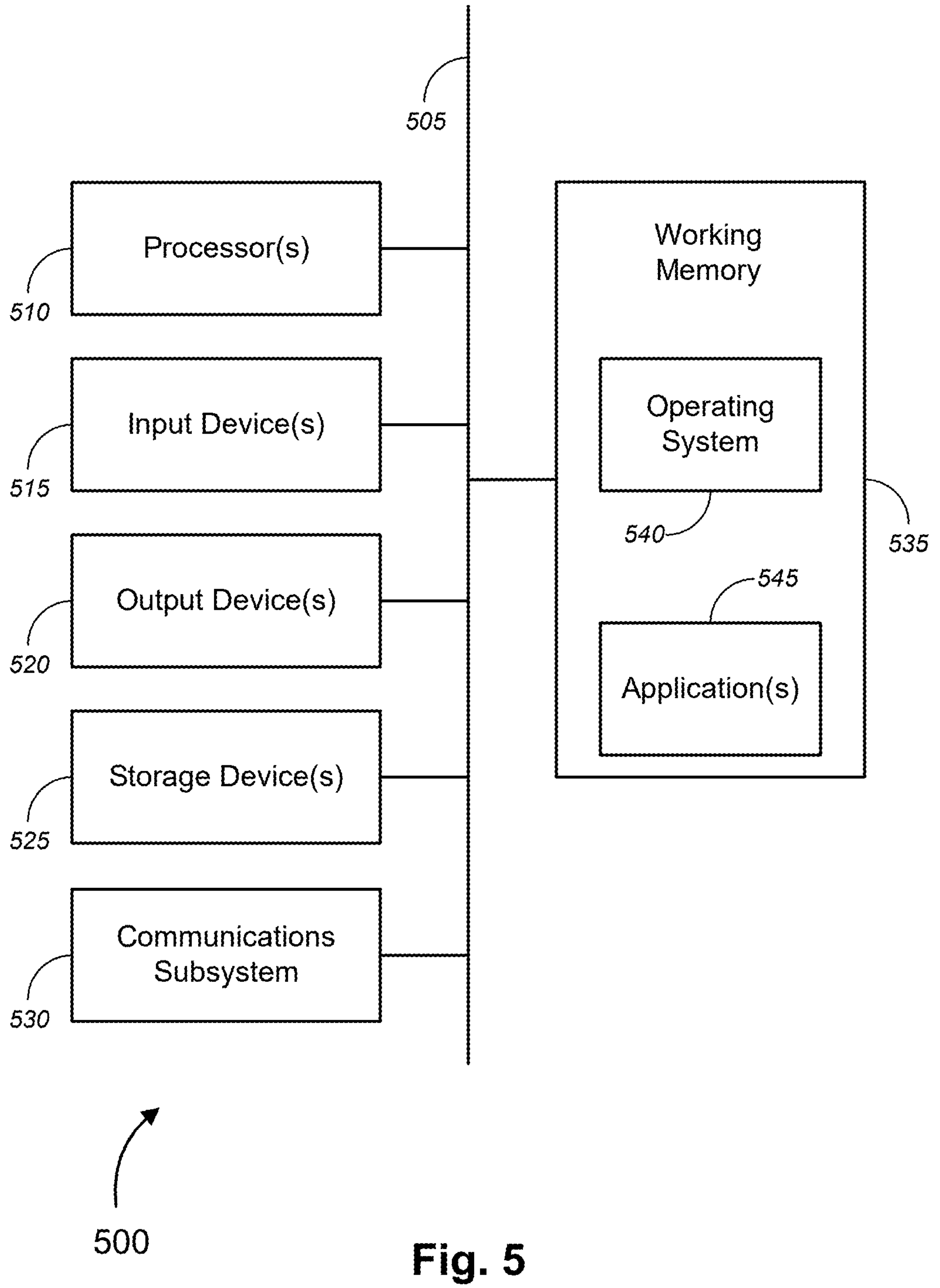
FIG. 5 depicts a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., remediation tools 105, 205, 205', 305, and 305', and/or microcontroller device 165, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., remediation tools 105, 205, 205', 305, and 305', and/or microcontroller device 165, etc.), described above with respect to FIGS. 1-4—is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further include a working memory 535, which can include a RAM or ROM device, as described above.

The computer or hardware system 500 also may include software elements, shown as being currently located within the working memory 535, including an operating system 540, device drivers, executable libraries, and/or other code, such as one or more application programs 545, which may include computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that include the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:

a compressed air hose that is configured to direct compressed air from an external compressed air source to a remediation tool; and the remediation tool that is configured to move within an inner portion of lead sheathing for installed telecommunications cables and to remove material from at least one of the installed telecommunications cables or the lead sheathing, the remediation tool including:

a first body portion;

a microcontroller device disposed within the first body portion;

a connector that extends from a rear portion of the first body portion and that is configured to connect with the compressed air hose;

a transducer that is configured to convert motion from compressed air that is input via the connector into electrical power;

a power regulation circuit that is configured to convert the electrical power that is output from the transducer into regulated electrical power;

a second body portion;

one or more sensors disposed on or in at least one of the first body portion or the second body portion; and a material removal tool disposed within the second body portion, the material removal tool being configured to remove material from at least one of the inner portion of the lead sheathing or the lead sheathing itself.

2. The system of claim 1, wherein the microcontroller device comprises one of:

a processor and controller circuitry;

a microprocessor circuit;

a single-board computer;

a single-board microcontroller; or a central processing unit ("CPU") and controller circuitry.

3. The system of claim 1, wherein the transducer includes one of:

a fan or micro-turbine and an alternator-based electrical generator that converts motion of blades of the fan or micro-turbine due to the input compressed air into electrical power; or a piezo-electric-based electrical generator that converts force from the input compressed air impinging on a piezo-electric interface component into electrical power.

4. The system of claim 1, wherein the compressed air hose includes embedded contact lines for power and ground connections that are configured to provide external power to components of the remediation tool via electrical interface devices disposed at the connector and within at least one of the first body portion or the second body portion.

5. The system of claim 1, wherein the compressed air hose includes a plurality of compressed air hoses connected one to the next in series between the external compressed air source and the connector of the remediation tool.

6. The system of claim 1, wherein the first body portion and the second body portion are one of:

integrated as a single body; or modular components that are configured to removably affix to one another or to a third body portion.

7. The system of claim 1, wherein the material removal tool includes:

a shredding device including one of a drill bit, a grinder, one or more rotary blades, or one or more auger-based blades, the shredding device being configured to cut and remove cable material and other material within and from the inner portion of the lead sheathing for the installed telecommunications cables.

8. The system of claim 7, wherein the remediation tool further includes:

an impeller that is configured to direct material, which has been removed from the installed telecommunications cables and which has been cut into pieces by the shredding device, toward the rear portion of the first body portion; and an outlet that is disposed in the rear portion of the first body portion, the outlet allowing the material that is directed by the impeller to exit the remediation tool.

9. The system of claim 8, further comprising at least one of:

a sleeve that is affixed to the outlet and that is configured to direct the material and rebounded compressed air that has passed through the outlet back within the lead sheathing toward the external compressed air source; or a filter system that is configured to collect the material that is directed through the outlet by the impeller.

10. The system of claim 8, wherein the remediation tool further includes:

at least one protective enclosure that is configured to cover and protect one or more of the microcontroller device, the connector, the transducer, the power regulation circuit, or the one or more sensors from material moving within an interior of each of the first body portion and the second body portion, while allowing the compressed air to pass through the interior of each of the first body portion and the second body portion.

11. The system of claim 1, wherein the material removal tool includes:

a lead removal device including a series of blades that is configured to extend and contract radially to make contact with lead material in the lead sheathing and to remove the lead material from the lead sheathing for the installed telecommunications cables.

12. The system of claim 1, wherein the remediation tool further includes:

a propulsion system that is configured to provide motive force to propel the remediation tool in at least one of a forwards or a backwards direction within the inner portion of the lead sheathing for the installed telecommunications cables, wherein the propulsion system includes a plurality of motorized cogs or wheels that is disposed on an external portion of at least one of the first body portion or the second body portion.

13. The system of claim 1, wherein the one or more sensors include one or more of a humidity sensor, a moisture sensor, a temperature sensor, a pressure sensor, a wind speed sensor, an air flow sensor, a sound sensor, a pH sensor, a soil sensor, a location sensor, a depth sensor, a speed sensor, a power sensor, or an image sensor.

14. A system, comprising:

a remediation tool that is configured to move within an inner portion of lead sheathing for installed telecommunications cables and to remove material from at least one of the installed telecommunications cables or the lead sheathing, the remediation tool including:

a first modular section, including:

a first body portion;

a microcontroller device disposed within the first body portion;

a connector that extends from a rear portion of the first body portion and that is configured to connect with a compressed air hose that is configured to direct compressed air from an external compressed air source to an interior portion of the remediation tool via the connector;

a transducer that is configured to convert motion from compressed air that is input via the connector into electrical power;

a power regulation circuit that is configured to convert the electrical power that is output from the transducer into regulated electrical power; and an outlet that is disposed in the rear portion of the first body portion;

a second modular section, including:

a second body portion; and a material removal tool disposed within the second body portion, the material removal tool being configured to remove material from at least one of the inner portion of the lead sheathing or the lead sheathing itself;

one or more sensors disposed on or in at least one of the first body portion or the second body portion;

a propulsion system that is disposed on or in at least one of the first body portion or the second body portion and that is configured to provide motive force to propel the remediation tool in at least one of a forwards or a backwards direction within the inner portion of the lead sheathing for the installed telecommunications cables; and an interface for removably connecting the first modular section and the second modular section together.

15. The system of claim 14, wherein the second modular section is configured to cut and remove cable material and other material within the inner portion of the lead sheathing for the installed telecommunications cables, wherein the material removal tool includes a shredding device including one of a drill bit, a grinder, one or more rotary blades, or one or more auger-based blades, wherein the remediation tool further includes:

an impeller that is configured to direct material, which has been removed from the installed telecommunications cables and which has been cut into pieces by the shredding device, toward the rear portion of the first body portion;

wherein the outlet allows the material that is directed by the impeller to exit the remediation tool.

16. The system of claim 14, wherein the second modular section is configured to remove lead material from the lead sheathing for the installed telecommunications cables, wherein the material removal tool includes:

a lead removal device including a series of blades that is configured to extend and contract radially to make contact with lead material in the lead sheathing while cutting and removing the lead material; and a deployable sheath that extends on an end of the remediation tool that is opposite from the connector and that is configured to expand radially to create a collapsible wall and at least a partial seal against the lead sheathing or soil beyond the lead sheathing and to allow compressed air that is directed from the connector to rebound against the collapsible wall back toward the outlet.

17. The system of claim 14, wherein the remediation tool further includes at least one of:

a sleeve that is affixed to the outlet and that is configured to direct the material and rebounded compressed air that has passed through the outlet back within the lead sheathing toward the external compressed air source;

a filter system that is configured to collect the material that is directed through the outlet by the impeller; or at least one protective enclosure that is configured to cover and protect one or more of the microcontroller device, the connector, the transducer, the power regulation circuit, or the one or more sensors from material moving within the interior portion of the remediation tool, while allowing the compressed air to pass through the interior portion of the remediation tool.

18. A method, comprising:

engaging, by a microcontroller device of a remediation tool, a propulsion system that is disposed on or in the remediation tool that has been positioned within an inner portion of lead sheathing for installed telecommunications cables, to cause the remediation tool to be propelled in at least one of a forwards or a backwards direction within the inner portion of the lead sheathing, the propulsion system and the microcontroller device being powered by compressed air that is converted into electrical power by a transducer and a power regulation circuit that are disposed within the remediation tool, the compressed air being directed toward the transducer from an external compressed air source via a compressed air hose and a connecter that extends from a rear portion of the remediation tool;

engaging, by the microcontroller device, a material removal tool of the remediation tool, to remove material from at least one of the inner portion of the lead sheathing or the lead sheathing itself; and engaging, by the microcontroller device, an impeller of the remediation tool, to direct material that has been removed from the at least one of the inner portion of the lead sheathing or the lead sheathing itself toward and through an outlet that is disposed in a rear portion of the remediation tool to exit the remediation tool.

19. The method of claim 18, wherein the material removal tool includes at least one of:

a shredding device including one of a drill bit, a grinder, one or more rotary blades, or one or more auger-based blades, the shredding device being configured to cut and remove cable material and other material within and from the inner portion of the lead sheathing for the installed telecommunications cables; or a lead removal device including a series of blades that is configured to extend and contract radially to make contact with lead material in the lead sheathing and to remove the lead material from the lead sheathing for the installed telecommunications cables;

wherein the remediation tool further includes at least one of:

a sleeve that is affixed to the outlet and that is configured to direct the material and rebounded compressed air that has passed through the outlet back within the lead sheathing toward the external compressed air source; or a filter system that is configured to collect the material that is directed through the outlet by the impeller.

20. The method of claim 18, further comprising:

when engaging the lead removal device, deploying, by the microcontroller device, a deployable sheath that extends on an end of the remediation tool that is opposite from the connector, to expand radially to create a collapsible wall and at least a partial seal against the lead sheathing or soil beyond the lead sheathing and to allow compressed air that is directed from the connector to rebound against the collapsible wall back toward the outlet.

* * * * *